April 16, 1946.  F. H. LE JEUNE  2,398,501
REINFORCED BRAKE DRUM
Filed June 16, 1943   2 Sheets-Sheet 1

Inventor
Frank H. LeJeune
By Beaman + Leng Ford
Attorneys

April 16, 1946.   F. H. LE JEUNE   2,398,501
REINFORCED BRAKE DRUM
Filed June 16, 1943   2 Sheets-Sheet 2
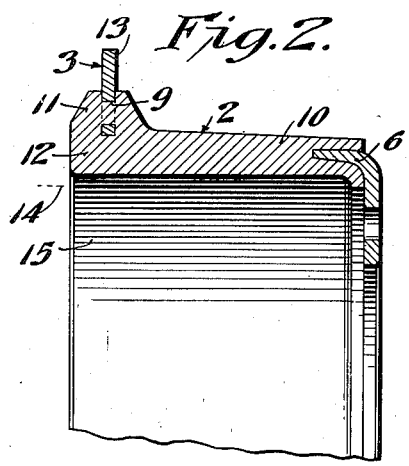
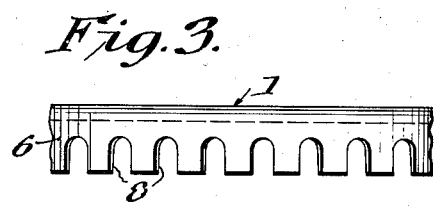
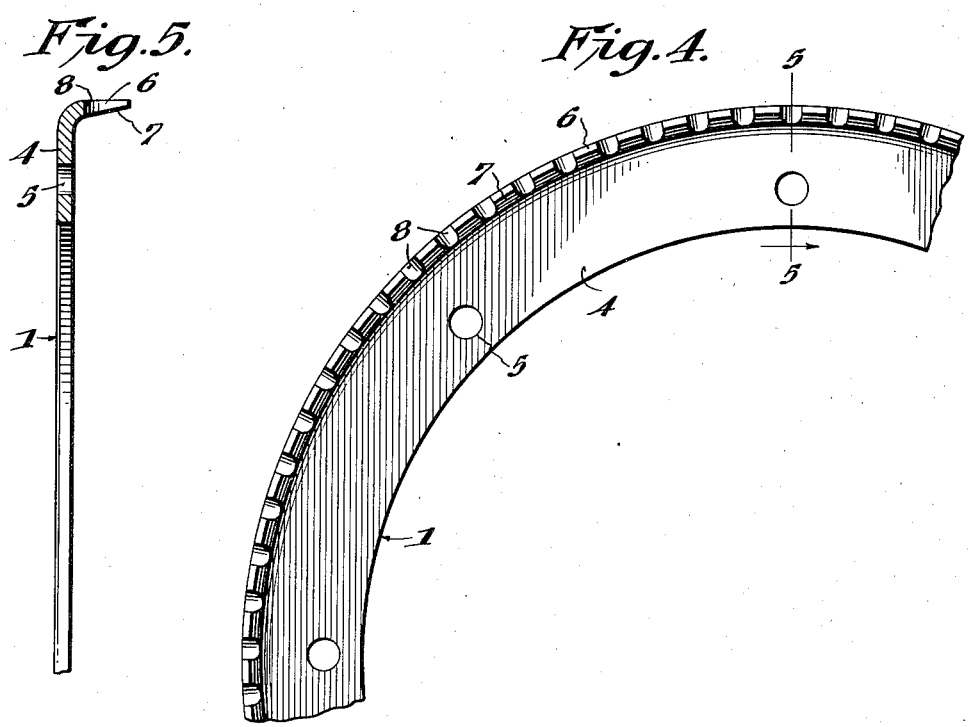
Inventor
Frank H. Le Jeune
By Beaman & Langford
Attorneys Patented Apr. 16, 1946

2,398,501

UNITED STATES PATENT OFFICE 2,398,501

REINFORCED BRAKE DRUM

Frank H. Le Jeune, Jackson, Mich., assignor to Hayes Industries, Inc., Jackson, Mich., a corporation of Michigan Application June 16, 1943, Serial No. 490,999

3 Claims. (Cl. 188—218)

My invention relates to brake drums, and particularly to a composite sheet metal and cast metal brake drum having the sheet metal disposed to reinforce and guard against breaking of the cast portions of the drum as placed in service.

An object of this invention is to provide a composite brake drum having the annular brake engaging portion of cast metal and having a sheet metal ring embedded in and substantially encircling the open end of the brake engaging portion in manner to tie the casting together and reinforce the same against breaking or splitting due to heat expansion or other causes.

Still another purpose is to so construct the composite brake drum that a sheet metal or sheet steel mounting ring has portions extending therein embedded in an annular brake engaging portion of cast metal or cast iron, and a sheet metal or sheet steel band or ring is embedded in the annular cast iron brake engaging portion around the open end thereof to serve as a reinforcing band tying and binding the annular casting against breaking or cracking and at the same time serving as a heat exchange or heat dissipating rib to extract and dissipate heat as frictionally generated in the cast iron portion during braking operation.

With the above and other objects in view, some of which will be apparent to those skilled in the art, and others of which are inherent in the construction and the manner of use, this invention includes certain novel features of construction and combinations and arrangements of parts which will be hereinafter set forth in connection with the drawings and then pointed out in the claims.

In the drawings:

Fig. 2 is an enlarged fragmentary sectional view through one side of the brake drum as illustrated in Fig. 1, and taken substantially in an axial plane.

Fig. 3 is a fragmentary top edge view of the sheet metal mounting ring.

Fig. 4 is a fragmentary end elevational view of the mounting ring.

Fig. 5 is a fragmentary sectional view substantially on line 5—5 of Fig. 4.

Figure 1:
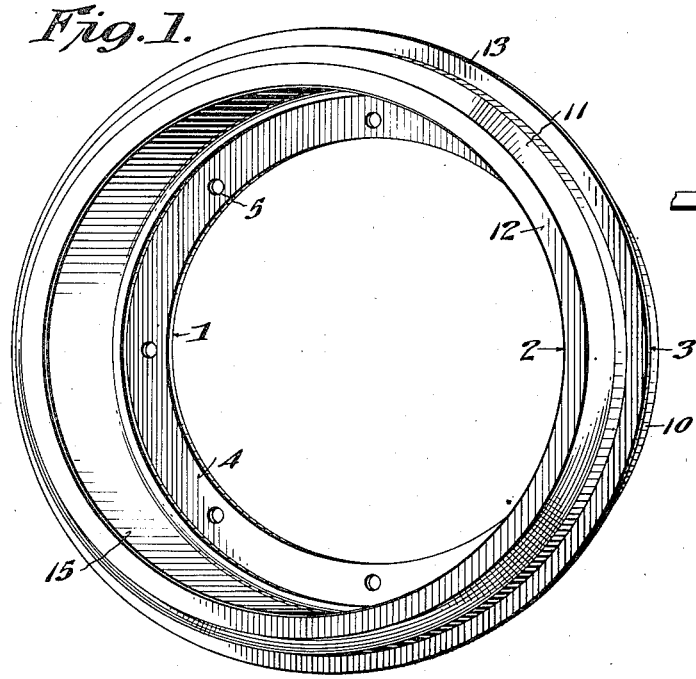
Figure 1 is a view in perspective looking into the open end of a brake drum structure and illustrating an embodiment of this invention.
Figure 7:
Fig. 7 is a sectional view substantially on line 7—7 of Fig. 6.

In the embodiment as illustrated, the composite brake drum is made up of a sheet metal mounting ring 1, an annular cast metal brake engaging flange 2, and a sheet metal reinforcing ring 3.

The mounting ring 1 is made up of sheet metal or sheet steel stamped or drawn or otherwise formed to the desired shape, and consists of a mounting flange 4 of ring-shaped form adapted to be applied to a wheel or other structure upon which the drum is to be mounted, this flange 4 being provided with openings 5 to receive mounting bolts or other fastenings. At its outer edge, the flange 4 is provided with an annular ring flange 6, which flange is preferably tapered or reduced in thickness, as at 7, the flange being of relatively less width in axial line than the width of the annular brake engaging portion 2. The flange 6 has a plurality of notches or openings 8 cut or stamped or otherwise formed to extend inwardly from its outer edge, as perhaps best shown in Fig. 3.

Figure 6:
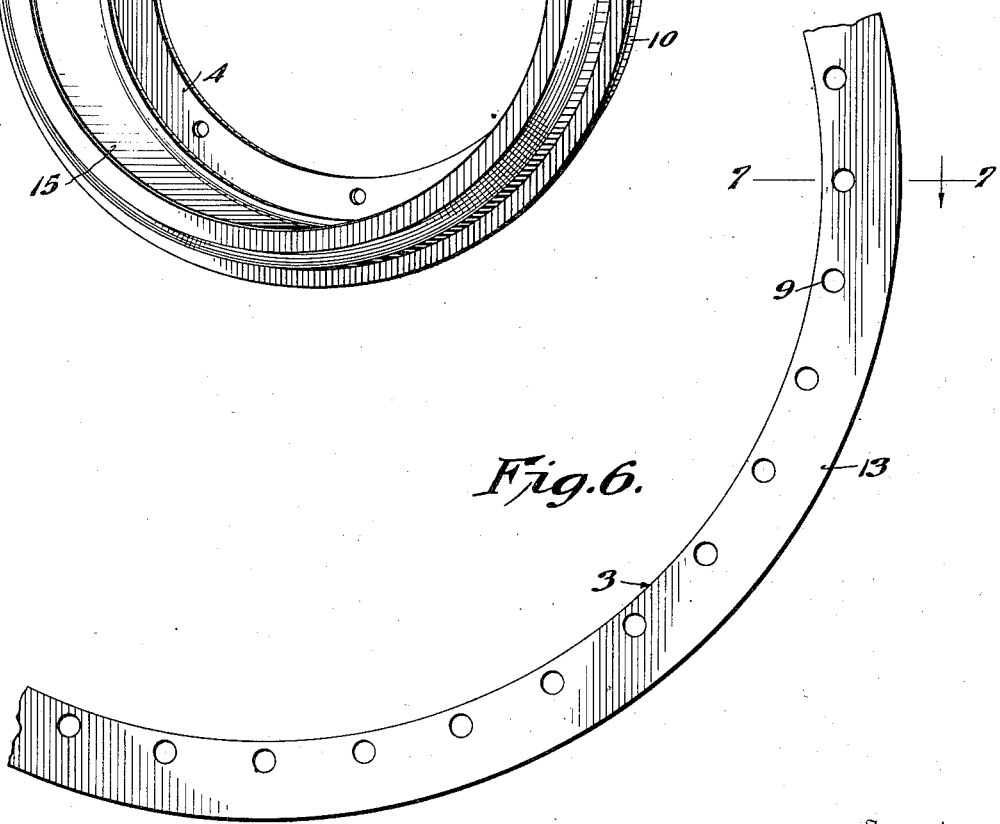
Fig. 6 is a fragmentary side elevational view showing the sheet metal reinforcing ring.

The reinforcing ring or band 3 is also preferably made of sheet metal or sheet steel stamped or cut or otherwise formed to the desired shape and size; and, this ring 3 has a plurality of openings 9 bored or stamped or otherwise formed therethrough in an annular series, as disclosed in Fig. 6. This ring 3 is preferably of greater diameter within its inner opening than the outer diameter of the annular flange 6 of the mounting ring 1, for reasons and purposes which will be hereinafter more fully explained.

The cast metal or cast iron annular drum-shaped brake engaging portion 2 is cast to the desired shape and size, by centrifugally casting within a mold, by casting in a sand mold, or in any other desired and suitable manner, so that the inner portion 10 thereof embeds and securely holds upon the major portion of the ring flange 6 and fills within the notches or openings 8, thereby uniting and securely retaining the two parts connected together and against relative rotational or other movement. At the same time, the casting 2 is provided with an enlarged annular bead or boss 11 around the outer or mouth or open end thereof, with the inner portion of the sheet metal or sheet steel reinforcing ring embedded within this annular boss or bead portion 11, the cast metal being cast to fill the openings 9. Since the sheet metal reinforcing ring 3 is of relatively larger internal diameter than the sheet metal mounting member 1, the body portion 12 of the cast iron or cast metal brake engaging portion 2 can be made of substantially uniform thickness and mass throughout the main part of the brake engaging portion, and the annularly outstanding bead or boss 11 will increase the mass of cast metal around the open end of the body 12 so that heat drawn thereto will be dissipated through the outstanding vane or rib portion 13 of the reinforcing ring 3.

In casting the portion 2, the internal diameter can be made sufficiently smaller, as perhaps indicated by the line at 14, so that the assembled brake drum can be turned down or finished to provide a surfaced brake engaging face at 15.

By tapering the flange 6, as at 7, the mass and strength of the body 12 of the cast portion 2 can be made relatively thicker toward the inner wall, and since the cast metal flows into the notches or openings 8, the cast metal portion 2 will be rigidly and substantially unitarily combined with the mounting ring 1. Further, since the reinforcing ring 3 has the embedded portion thereof substantially entirely within the outstanding annular bead or boss portion 11, the full strength of the cast iron or cast metal portion 2 will be maintained throughout the entire width of the body 12, and this embedding of the sheet steel or sheet metal ring 3 within the cast portion 11 will interpose the ring 3 as a reinforcing band around the open end of the cast brake engaging flange 2. The extending portion 13 of this ring 3 will serve as a heat dissipating or heat exchange vane or rib that will aid in the removal of frictionally generated heat from the cast portion 2 and will serve to insure lower operating temperatures and will at the same time bind the casting together at the open end and to guard against breaking or splitting of the drum when in service.

While I have herein shown and described only certain specific embodiments of my invention and have suggested only certain possible modifications, it will be appreciated that many changes and variations can be made in the shape and arrangement and assembly of the parts, to suit different conditions of installation and use, without departing from the spirit and scope of my invention.

I claim:

1. A brake drum comprising a stamped sheet steel mounting ring provided with an annular peripheral flange and having openings in said flange leaving intermediate projections, a cast iron brake engaging flange cast upon the annular flange of the mounting ring and filling said openings, said cast iron brake engaging flange having an outstanding bead-like boss portion peripherally around the open end thereof, and an annular sheet steel washer-like reinforcing ring provided with a plurality of openings around its inner peripheral portion and having this inner peripheral portion embedded in the boss portion of the cast iron brake engaging flange during the casting operation.

2. A brake drum comprising a sheet steel mounting ring having the outer peripheral edge thereof bent annularly in the formation of an annular flange, said annular flange being reduced in thickness toward its edge and being provided with a plurality of spaced openings leaving intervening projections, an annular cast iron brake engaging flange cast upon and embedding the annular flange of the mounting ring, and an annular sheet steel reinforcing ring cast within the annular cast iron brake engaging flange and outstanding around the open end of said cast portion.

3. A brake drum comprising a stamped sheet steel mounting ring having fastening receiving openings therethrough, said sheet steel mounting ring being provided around its outer periphery with an annular flange reduced in thickness toward its edge and having a plurality of openings therethrough leaving intervening projections, an annular cast iron brake engaging flange cast upon and embedding the annular flange of the mounting ring, a stamped sheet steel reinforcing ring of larger diameter having a plurality of openings in its inner peripheral portion, and said annular cast iron brake engaging flange having an outstanding bead-like boss peripherally around its open end in which the inner peripheral portion of said sheet steel reinforcing ring is embedded during the casting of said brake engaging flange.

FRANK H. LE JEUNE.